Nov. 22, 1932.  V. A. SCHOENBERG  1,888,293
SOUND PICTURE ATTACHMENT FOR MOVING PICTURE MACHINES
Filed Nov 16, 1929
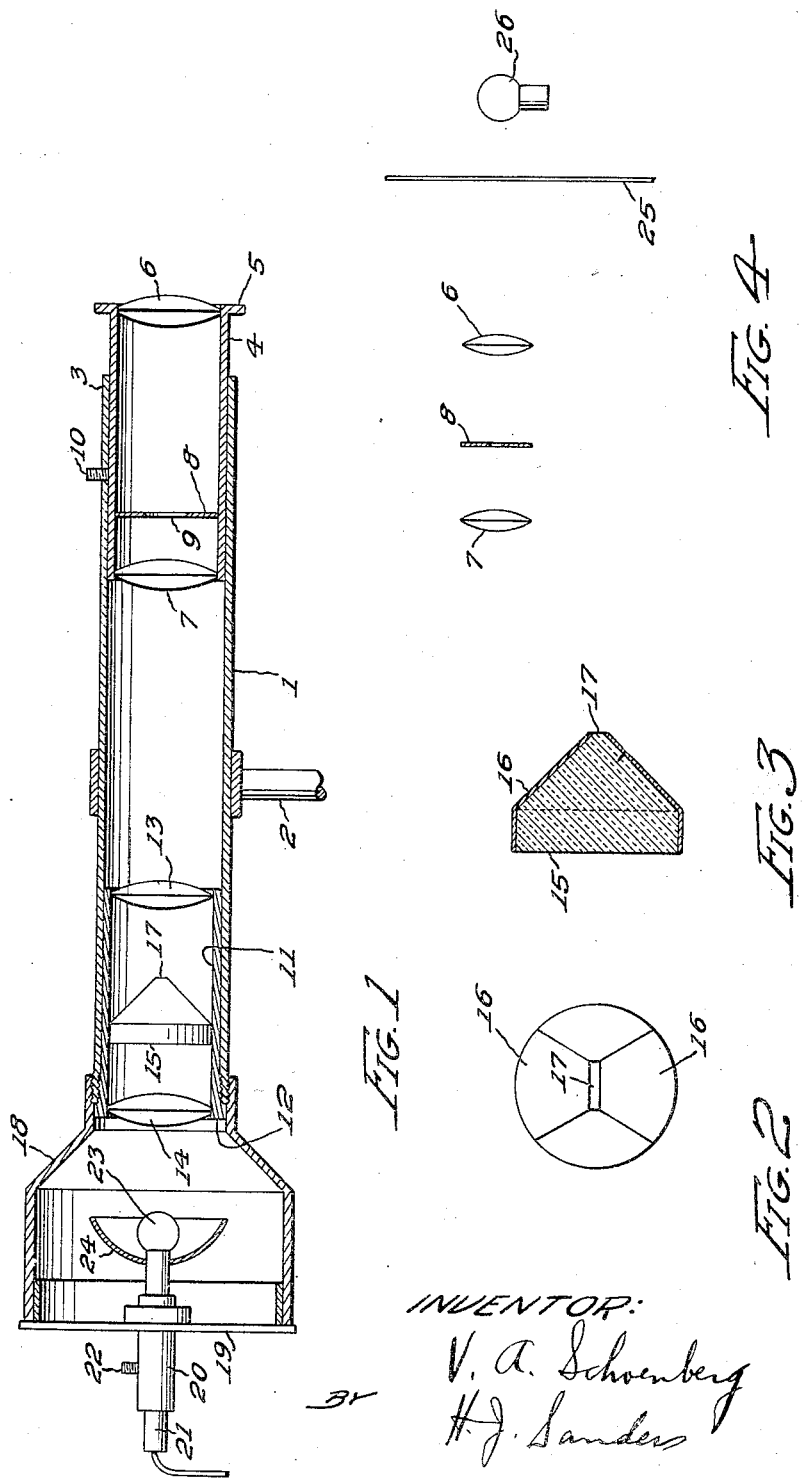
INVENTOR:
V. A. Schoenberg
H. J. Sanders
ATTORNEY Patented Nov. 22, 1932

1,888,293

UNITED STATES PATENT OFFICE

VIRGIL A. SCHOENBERG, OF MORTON GROVE, ILLINOIS, ASSIGNOR TO LIGHT-SENSITIVE APPARATUS CORPORATION, OF NILES CENTER, ILLINOIS

SOUND PICTURE ATTACHMENT FOR MOVING PICTURE MACHINES

Application filed November 16, 1929. Serial No. 407,683.

This invention relates to an attachment for moving picture machines or devices constructed in accordance therewith for producing or reproducing talking moving pictures. One object of the invention is to incorporate in a unit all of the projecting apparatus including the projecting lamp. A further object is to provide an assembly for projecting an increased amount of light through the talking strip of the film thereby causing the photo-electric cell to respond more freely to all frequencies registered upon the film.

A still further object is to project beams of light optically or by a beveled cylindrical lens. A further object is to provide means for increasing the volume of illumination without increasing the amount of light at its source. A further object is to eliminate distortion of the light beam that is commonly caused by dust or other extraneous matter.

With the foregoing and other objects in view the invention consists in the combination and arrangement of parts to be hereinafter fully described, pointed out in the claim and illustrated in the accompanying drawing which forms a part of this application for patent and in which—

Fig. 1 is a longitudinal sectional view through the moving picture machine attachment.

Fig. 2 is a front view of a beveled cylindrical lens employed.

Fig. 3 is a central vertical sectional view through Fig. 2.

Fig. 4 is a schematic view of a portion of the mechanism including a strip of film and a photo-electric cell.

Like reference characters denote corresponding parts throughout the several views.

The attachment for moving picture machines comprises the tubular open ended body member 1 supported by the bracket 2 which is suitably attached to the frame or other part of a moving picture machine.

Telescopically received in one end 3 of the body member 1 is the short cylinder 4 formed with a terminal flange 5 at its outer end, said cylinder having the lenses 6, 7 mounted in its ends and a diaphragm 8, formed with a light opening 9, mounted in its interior between said lenses. A set screw 10 extends through a perforation in the member 1 for frictional engagement with the cylinder 4 whereby to secure it in adjusted position relative to said member.

One end of the body member 1 is threaded interiorly for engagement with the exteriorly threaded portion of the telescopically received tube 11 which at one end is formed with the bead 12 that may abut the end of the member 1 to prevent the tube from being swallowed up in said member. Lenses 13, 14 are mounted in the ends of said tube and between said lenses and within said tube is mounted the beveled cylindrical lens 15 coated with a black paint 16 except for the space 17 that forms a light slit or transparent portion.

Threaded upon one end of the member 1 is the lamp housing 18 that is closed at one end by the cap 19 in a perforation in which the sleeve 20 is mounted that adjustably receives the tube 21, held in adjusted position by the screw 22, that carries the lamp 23 disposed within said housing and provided with the reflector 24 that directs the light rays upon the lens 14 from which they are made to converge upon the beveled cylindrical lens 15 and through the slit 17 in which they are directed upon the lens 13. From the lens 13 the rays are directed upon the lens 7 and therefrom through the light slit 9 in the diaphragm 8 to the lens 6 from which they are focused upon the film strip 25 and through the same to the photo-electric cell 26.

The relative positions of the lenses 6, 7 and the diaphragm 8 are determined at the factory and these positions thereafter are permanent. The cylinder 4 may be adjusted relative to the member 1 and the lamp 23 relative to the lens 14.

The most advantageous focus of the light beams is made possible in this manner. The accumulation of dust in the light path is prevented by this specific assembly. The beveled cylindrical lens 15 will not collect any appreciable amount of dust at its transparent portion 17 and the lenses 14, 13 and 7 are spaced, by the cylinder 4 and the tube 11, from the inner periphery of the body member 1.

What is claimed is:—

In a sound picture attachment for moving picture machines, a sectional shield unit having its sections disposed all in a straight line, the two end sections being instantly adjustable longitudinally of the cooperating sections manually, a light source adjustable in one end, and means within said shield unit for focusing light received therefrom and for projecting all of the same optically and in a rectangular beam upon an objective spaced a material distance therefrom.

In testimony that I claim the foregoing as my own I have hereto affixed my signature.

VIRGIL A. SCHOENBERG.